United States Patent [19]

Schröder et al.

[11] Patent Number: 5,750,742

[45] Date of Patent: May 12, 1998

[54] OLIGOMERIC TRIARYLMETHANE DYES

[75] Inventors: Gunter-Rudolf Schröder, Mannheim; Udo Mayer, Frankenthal; Ulf Baus, Dossenheim; Johannes Peter Dix, Weisenheim, all of Germany

[73] Assignee: BASF Aktiengesellschaft, Ludwigshafen, Germany

[21] Appl. No.: 776,605

[22] PCT Filed: Aug. 4, 1995

[86] PCT No.: PCT/EP95/03111

§ 371 Date: Feb. 19, 1997

§ 102(e) Date: Feb. 19, 1997

[87] PCT Pub. No.: WO96/06139

PCT Pub. Date: Feb. 29, 1996

[30] Foreign Application Priority Data

Aug. 19, 1994 [DE] Germany .................. 44 29 549.9

[51] Int. Cl.⁶ ........................................ C07C 217/42
[52] U.S. Cl. ............................. 552/109; 564/326
[58] Field of Search .................... 564/326; 552/109

[56] References Cited

U.S. PATENT DOCUMENTS

| 4,223,144 | 9/1980 | Kast et al. | 544/392 |
| 4,353,833 | 10/1982 | Bruder et al. | 552/110 |

FOREIGN PATENT DOCUMENTS

| A 31 070 | 10/1982 | European Pat. Off. . |
| A 2401958 | 9/1980 | France . |

Primary Examiner—Richard L. Raymond

Attorney, Agent, or Firm—Oblon, Spivak, McClelland, Maier & Neustadt, P.C.

[57] ABSTRACT

Triarylmethanes of the formula

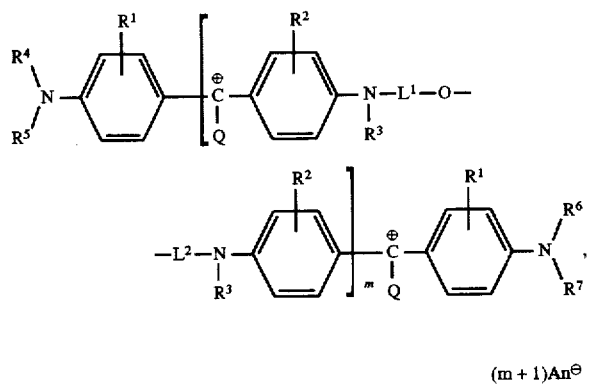

$(m+1)An^\ominus$ where
m is from 1 to 100,
$L^1$ and $L^2$ are each $C_2$–$C_4$-alkylene,
$R^1$ and $R^2$ are each hydrogen, $C_1$–$C_4$-alkyl, $C_1$–$C_4$-alkoxy or halogen,
$R^3$ is hydrogen or substituted or unsubstituted $C_1$–$C_4$-alkyl,
$R^4$, $R^5$,
$R^6$ and $R^7$ are each hydrogen, substituted or unsubstituted $C_1$–$C_4$-alkyl, or substituted or unsubstituted phenyl,
Q is aryl, and
$An^\ominus$ is the equivalent of an anion,
are useful for dyeing or printing polymeric material.

10 Claims, No Drawings

OLIGOMERIC TRIARYLMETHANE DYES

This application is a 371 of PCT/EP95/03111, filed Aug. 4, 1995. The present invention relates to novel triarylmethanes of the formula I

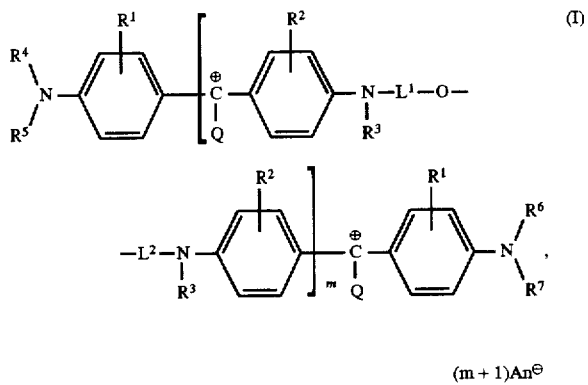

(m+1)An$^{\ominus}$ where m is from 1 to 100, $L^1$ and $L^2$ are independently of each other $C_2$–$C_4$-alkylene, $R^1$ and $R^2$ are independently of each other hydrogen, $C_1$–$C_4$-alkyl, $C_1$–$C_4$-alkoxy or halogen, $R^3$ is in each case hydrogen or $C_1$–$C_4$-alkyl, which may be substsituted by hydroxyl, $C_1$–$C_4$-alkoxy, halogen or cyano, $R^4$, $R^5$, $R^6$ and $R^7$ are independently of one another hydrogen, $C_1$–$C_4$-alkyl, which may be hydroxyl-, $C_1$–$C_4$-alkoxy-, halogen- or cyano-substituted, substituted or unsubstituted phenyl or a radical of the formula

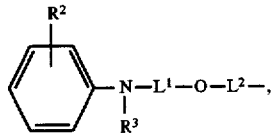

where $L^1$, $L^2$, $R^2$ and $R^3$ are each as defined above,

Q is a radical of the formula

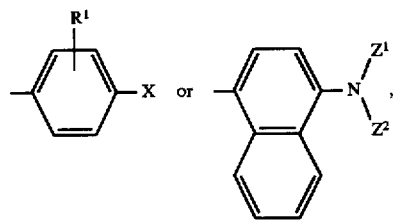

where $R^1$ is as defined above, x is hydrogen, $C_1$–$C_4$-alkyl, $C_1$–$C_4$-alkoxy or a radical of the formula —$NZ^1Z^2$, and $Z^1$ and $Z^2$ are independently of each other hydrogen or $C_1$–$C_4$-alkyl, which may be hydroxyl-, $C_1$–$C_4$-alkoxy-, halogen- or cyano-substituted, or substituted or unsubstituted phenyl, and An$^{\ominus}$ is the equivalent of an anion, and to the use thereof for dyeing or printing polymeric material.

EP-A-31 070 discloses oligomeric triarylmethane dyes which are linked by alkylene bridges. However, it has been found that the dyes mentioned therein have disadvantages in their application properties.

It is an object of the present invention to provide novel oligomeric triarylmethane dyes. The novel dyes shall be advantageous for dyeing or printing polymeric material, especially paper stock, and shall be readily obtainable.

We have found that this object is achieved by the above-defined triarylmethanes of the formula I.

In the triarylmethanes of the formula I, the positive charge may also be mesomerically shifted.

Any alkyl or alkylene appearing in the abovementioned formula I may be straight-chain or branched.

In any substituted alkyl appearing in the abovementioned formula I the number of substituents is generally from 1 to 3.

Any substituted phenyl appearing in the abovementioned formula I may have as substituents for example $C_1$–$C_4$-alkyl, $C_1$–$C_4$-alkoxy or halogen. The number of substituents in substituted phenyl is generally from 1 to 3.

Within multiple $L^1$, as also within multiple $L^2$, $R^1$, $R^2$, $R^3$, $R^4$, $R^5$, $R^6$, $R^7$ and Q, the individual meanings can be identical or different.

$L^1$ and $L^2$ are each for example $(CH_2)_2$, $(CH_2)_3$, $(CH_2)_4$, $CH(CH_3)CH_2$ or $CH(CH_3)CH(CH_3)$.

$R^1$, $R^2$, $R^3$, $R^4$, $R^5$, $R^6$, $R^7$, X, $Z^1$ and $Z^2$ are each for example methyl, ethyl, propyl, isopropyl, butyl, isobutyl, sec-butyl or tert-butyl.

$R^3$, $R^4$, $R^5$, $R^6$, $R^7$, $Z^1$ and $Z^2$ may each also be for example 2-hydroxyethyl, 2- or 3-hydroxypropyl, 2- or 4-hydroxybutyl, 2-methoxyethyl, 2- or 3-methoxypropyl, 2- or 4-methoxybutyl, 2-ethoxyethyl, 2- or 3-ethoxypropyl, 2- or 4-ethoxybutyl, fluoromethyl, chloromethyl, difluoromethyl, dichloromethyl, trifluoromethyl, trichloromethyl, 2-fluoroethyl, 2-chloroethyl, 2- or 3-fluoropropyl, 2- or 3-chloropropyl, 2- or 4-fluorobutyl, 2- or 4-chlorobutyl, cyanomethyl, 2-cyanoethyl, 2- or 3-cyanopropyl or 2- or 4-cyanobutyl.

$R^1$, $R^2$ and X may each also be for example methoxy, ethoxy, propoxy, isopropoxy, butoxy, isobutoxy or sec-butoxy.

$R^1$ and $R^2$ may each also be for example fluorine, chlorine or bromine.

$R^4$, $R^5$, $R^6$, $R^7$, $Z^1$ and $Z^2$ may each also be for example phenyl, 2-, 3- or 4-methylphenyl, 2,4-dimethylphenyl, 2-, 3- or 4-ethylphenyl, 2-, 3- or 4-methoxyphenyl, 2,4-dimethoxyphenyl, 2-, 3- or 4-chlorophenyl or 2,4-dichlorophenyl.

Suitable anions for derivation of An$^{\ominus}$ include for example fluoride, chloride, bromide, iodide, perchlorate, hydrogensulfate, sulfate, aminosulfate, nitrate, dihydrogenphosphate, phosphate, hydrogencarbonate, carbonate, methosulfate, ethosulfate, cyanate, thiocyanate, tetrachlorozincate, borate, tetrafluoroborate, acetate, cyanoacetate, hydroxyacetate, aminoacetate, methylaminoacetate, mono-, di- or trichloroacetate, 2-chloropropionate, 2-hydroxypropionate, glycolate, thioglycolate, thioacetate, phenoxyacetate, trimethylacetate, valerate, palmitate, oleate, acrylate, oxalate, malonate, crotonate, succinate, citrate, methylenebisthioglycolate, ethylenebisiminoacetate, nitrilotriacetate, fumarate, maleate, benzoate, methylbenzoate, chlorobenzoate, dichlorobenzoate, hydroxybenzoate, aminobenzoate, phthalate, terephthalate, indolylacetate, chlorobenzenesulfonate, benzenesulfonate, toluenesulfonate, biphenylsulfonate or chlorotoluenesulfonate.

Preference is given to triarylmethanes of the formula I where m is from 2 to 30. Preference is further given to triarylmethanes of the formula I where $L^1$ and $L^2$ are independently of each other $C_2$- or $C_3$-alkylene.

Preference is further given to triarylmethanes of the formula I where $R^1$ and $R^2$ are independently of each other hydrogen or $C_1$–$C_4$-alkyl.

Preference is further given to triarylmethanes of the formula I where $R^3$ is in each case $C_1$–$C_2$-alkyl.

Preference is further given to triarylmethanes of the formula I where $R^4$ and $R^6$ are independently of each other $C_1$–$C_4$-alkyl and $R^5$ and $R^7$ are independently of each other $C_1$–$C_4$-alkyl, which may be hydroxyl- or cyano-substituted, or a radical of the formula

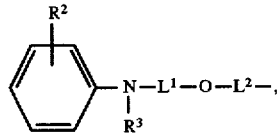

where $L^1$, $L^2$, $R^2$ and $R^3$ are each as defined above.

Preference is furthermore given to triarylmethanes of the formula I where Q is a radical of the formula

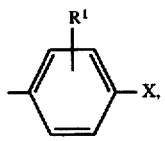

where $R^1$ and X are each as defined above.

Particular preference is given to triarylmethanes of the formula I where Q is a radical of the formula

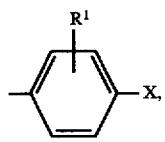

where $R^1$ is hydrogen or $C_1$–$C_4$-alkyl and X is hydrogen or a radical of the formula —$NZ^1Z^2$ where $Z^1$ and $Z^2$ are independently of each other $C_1$–$C_4$-alkyl, which may be substituted by hydroxyl or cyano.

The dyes of the formula I according to the present invention are obtainable by methods conventionally used in the preparation of triarylmethanes.

For instance, a doubled aniline of the formula II

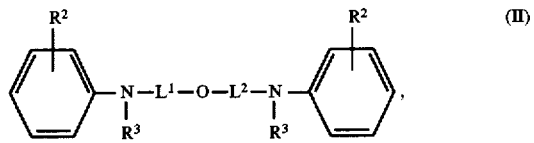

where $L^1$, $L^2$, $R^2$ and $R^3$ are each as defined above, can be reacted first with formaldehyde and then, under oxidizing conditions, with a compound of the formula III

Q—H  (III)

where Q is as defined above, subject to the proviso that the compound Q—H has an $NZ^1Z^2$ radical.

The chain-terminating function is in this case performed by the doubled aniline II.

This gives triarylmethanes of the formula I where $R^5$ and $R^7$ are each a radical of the formula

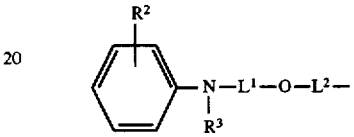

where $L^1$, $L^2$, $R^2$ and $R^3$ are each as defined above.

Such triarylmethanes can also be characterized by the formula Ia

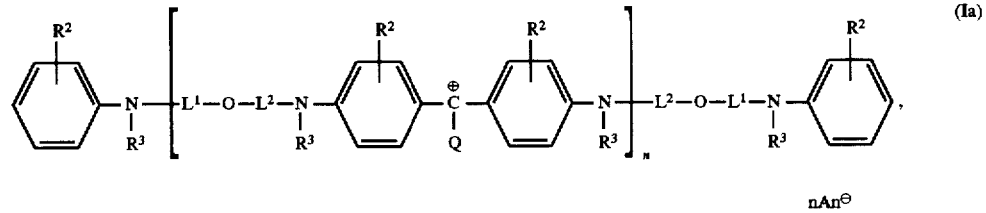

where $L^1$, $L^2$, $R^2$, $R^3$, Q and $An^\ominus$ are each as defined above and n is from 2 to 101, preferably from 3 to 21.

However, the reaction can also be carried out in the presence of other chain-terminating molecules. Examples include anilines of the formula IV

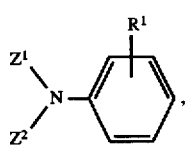

where $R^1$, $Z^1$ and $Z^2$ are each as defined above.

In this case the doubled aniline II may initially be reacted simultaneously with an aniline of the formula IV and formaldehyde and then, under oxidizing conditions, with an aniline of the formula III.

This gives triarylmethanes of the formula Ib

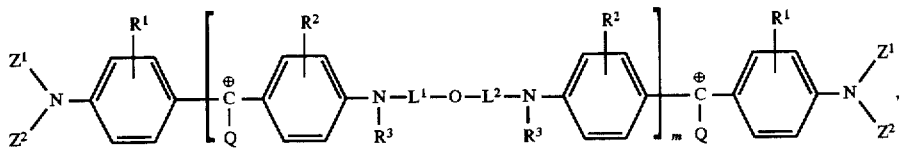

where m, $L^1$, $L^2$, Q, $R^1$, $R^2$, $R^3$, $Z^1$, $Z^2$ and $An^\ominus$ are each as defined above.

However, aldehydes of the formula V

Q—CHO  (V), where Q is as defined above, and urea can be combined to form bisbenzylideneureas of the formula VI

Q—CH=N—CO—N=CH—Q  (VI), where Q is in each case as defined above, which are then reacted with the dimeric aniline II and optionally subsequently with an aniline of the formula IV. To convert the resulting leuco compound into the dye form, a treatment under oxidizing conditions is carried out in addition.

The triarylmethanes of the formula I according to the present invention can be used alone or mixed with each other or with other cationic or anionic compounds in the form of their solutions or in the form of powders or granules.

They are advantageous for dyeing and printing polymeric material, especially paper stock, but also cellulose, cotton, leather, bast fibers, hemp, flax, sisal, jute, coir or straw.

Dye preparations comprising the novel triarylmethanes of the formula I are prepared in particular using polymers, such as polyacrylic acids, polyacrylic acid derivatives, polyvinylamines, polyvinylamides, polyvinyl acetates, polyvinyl alcohols, polyvinylpyrrolidones, polysiloxanes or copolymers of the respective monomers. Similarly, oligomers of ethyleneimine, ethylene oxide or propylene oxide or derivatives of these oligomers can be used. Also of great importance are N-alkylated pyrrolidones or N-(2-hydroxyethyl)pyrrolidones.

The triarylmethanes are preferably usable in the production of pulp-colored sized and unsized paper. They can likewise be used for coloring paper by the dip method.

Paper, leather or cellulose are colored/dyed in a conventional manner.

The novel dyes or preparations thereof cause little, if any, staining of the papermaking wastewater, which is particularly favorable for keeping surface waters clean. This applies especially to the dyeing of lignin-free pulp. They are highly substantive, do not marble on paper, and are substantially pH-insensitive. Colorings on paper are notable for good lightfastness. Prolonged exposure to light changes the hue on-tone. In addition, the dyes of the present invention are readily soluble.

The colored papers, which are readily bleachable, are wet-fast, resistant not only to water but also to milk, soapy water, sodium chloride solutions, fruit juices or soda water and, because of their good alcohol fastness, also to alcoholic beverages.

The novel dyes can also be used for dyeing, padding or printing polyacrylonitrile textiles or anionic-modified polyamide or polyester textiles. They are additionally suitable for the ink-jet process and for producing ballpoint pen pastes or ink ribbons.

The Examples which follow illustrate the invention.

EXAMPLE 1

In a stirred flask equipped with a distillation head, 2805 g (17 mol) of N-ethyl-N-(2-hydroxyethyl)aniline were admixed with 25 g of 50% strength by weight hypophosphorous acid ($H_3PO_2$) and heated to 200°–230° C. under nitrogen. 193 g of a two-phase water/aniline mixture were distilled off in the course of 6 h. The mixture was cooled back down to 80° C. and then, under reduced pressure, heated back up to 210° C. over 2.5 h. A final vacuum of <1 mm Hg was achieved. 37 g of distillate, consisting of unconverted starting material, were collected. The residue, a compound of the formula

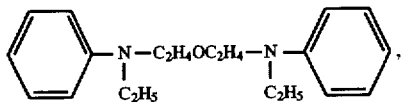

can be used for dye syntheses without further purification or else initially be isolated.

Yield: 2576 g $^1$H-NMR (CDCl$_3$): 1.15 ppm (t, 6H, CH$_3$), 3.50 ppm (m, 6H, CH$_2$), 6.67 ppm (m, 6H, ar-H), 6.67 ppm (m, 4H, ar-H).

EXAMPLE 2

31.2g (0.1 mol) of the compound of Example 1 were stirred over-night at room temperature in 100 g of glacial acetic acid together with 7.0 g (0.07 mol) of aqueous formaldehyde solution (30% strength by weight). 8.4 g (0.07 mol) of N,N-dimethylaniline were added and the mixture was heated to 43°–44° C. Then 1.0 g of chloranil and 1.0 g of the iron complex of dibenzotetraaza[14]annulene were added. The reaction batch was supplied with 1.5 l of oxygen (theory: 1.57 l ) by means of a gas buret with vigorous stirring in the course of 1.5 h while the temperature as held at 43°–44° C. Filtration yielded an approximately 16% strength by weight solution of the dye of the formula

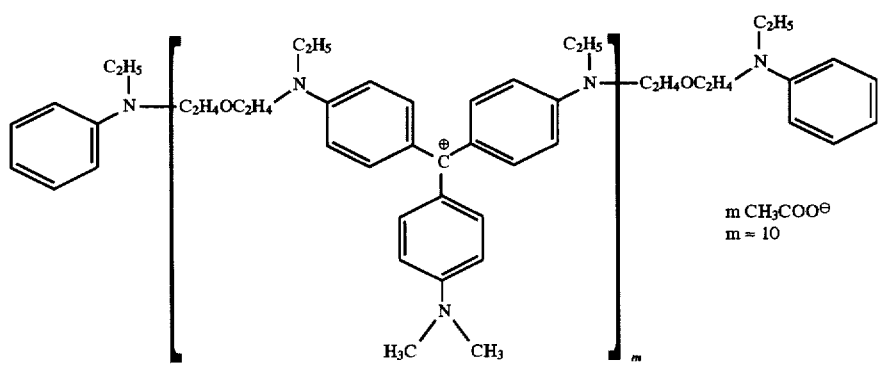

The same method gives the compounds listed below in Table 1.

TABLE 1

| Ex. No. | $W^1$ | $W^2$ | $W^3$ | m | Ring A | $\lambda_{max}$ in ethanol | Strength of dye solution [% by weight] |
|---|---|---|---|---|---|---|---|
| 3 | $C_2H_5$ | $C_2H_4OH$ | H | ca. 10 | unfused | 589 | 20 |
| 4 | $CH_3$ | $C_2H_4OH$ | H | ca. 10 | unfused | 584 | 21 |
| 5 | H | $C_2H_5$ | 2-$CH_3$ | ca. 10 | unfused | 588 | 21 |
| 6 | $C_2H_4CN$ | $C_2H_4OH$ | H | ca. 10 | unfused | 591 | 20 |
| 7 | $C_2H_4OH$ | $C_2H_4OH$ | H | ca. 10 | unfused | 592 | 20 |
| 8 | H | $C_6H_5$ | H | ca. 10 | benzofused | 594 | 20 |

EXAMPLE 9

31.8 g (0.3 mol) of benzaldehyde and 9.0 g (0.15 mol) of urea were dissolved in 200 ml of glacial acetic acid at 25° C. and held at 25° C. for 1 h. Then 43.0 g (0.14 mol) of the compound described in Example 1 were added and the mixture was heated at 60° C. for 1 h. A further 43.0 g (0.14 mol) of the compound described in Example 1 were added, the mixture was heated to 90° C. for 3 h and then cooled back down to 40° C. and oxidized with 3.1 l of oxygen as described in Example 2. The result was a water-miscible 40% strength by weight liquid brand of the dye of the formula

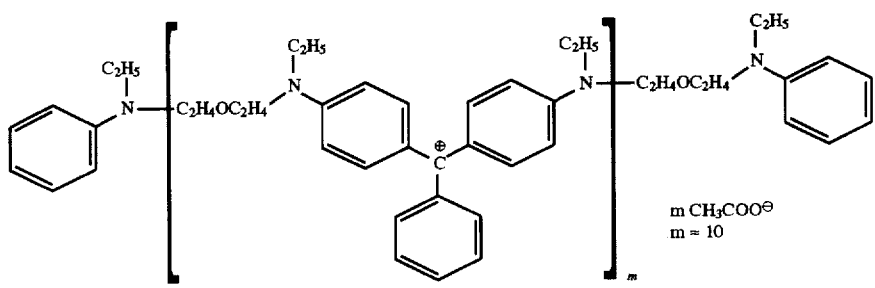

$\lambda_{max}$: 604nm

The same method gives the dyes listed below in Table 2.

TABLE 2

| Ex. No. | W | m | Strength of dye solution [% by weight] |
| --- | --- | --- | --- |
| 10 | 2-Cl | ca. 10 | 40 |
| 11 | 2-CH₃ | ca. 10 | 40 |
| 12 | 4-CH₃ | ca. 10 | 40 |

EXAMPLE 13

701 g (2.23 mol) of the compound described in Example 1 and 105.1 g (0.64 mol) of N-ethyl-N-(2-hydroxyethyl) aniline were dissolved in 2000 g of glacial acetic acid and heated to 60° C. 200 g (2 mol) of 30% strength by weight aqueous formaldehyde solution were then added dropwise in the course of 30 min and the mixture was subsequently stirred at 60° C. for a further 60 min. The mixture was then cooled down to 45° C., admixed with 330 g (2 mol) of N-ethyl-N-(2-hydroxyethyl)aniline, and heated to 43°–44° C. Then 20 g (0.08 mol) of chloranil and 20 g of the iron complex of dibenzotetraaza[14]annulene were added. Then air (200 l/h) was passed by means of an inlet tube into the reaction flask for 7 h with vigorous stirring while the temperature was held at 43°–44° C. This yielded 3000 g of a 30% strength by weight solution of the dye of the formula

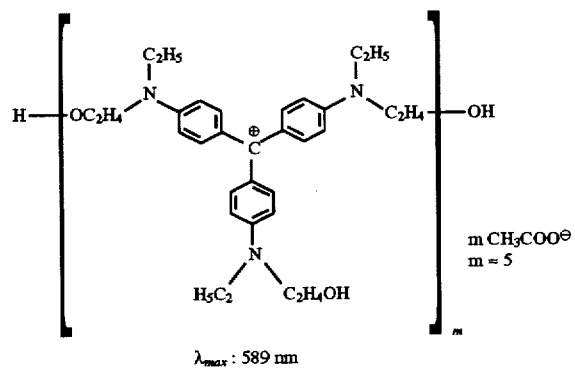

$\lambda_{max}$: 589 nm

EXAMPLE 14

701 g (2.23 mol) of the compound described in Example 1 and 70.1 g (0.425 mol) of N-ethyl-N-(2-hydroxyethyl)

aniline were dissolved in 2000 g of glacial acetic acid and heated to 60° C. 200 g (2 mol) of 30% strength by weight aqueous formaldehyde solution were then added gradually in the course of 30 min and the mixture was subsequently stirred at 60° C. for a further 60 min. The solution was then cooled down to 45° C., admixed with 358.5 g (2 mol) of N-ethyl-N-(2-hydroxyethyl)-3-methylaniline, and heated to 43°–44° C. Then 20 g (0.08 mol) of chloranil and 20 g of the iron complex of dibenzotetraaza[14]annulene were added. Then air (200 l/h) was passed by means of an inlet tube into the reaction flask for 7 h with vigorous stirring while the temperature was held at 43°–44° C. Cooling and filtration yielded 3000 g of an about 33% strength by weight solution of the dye of the formula

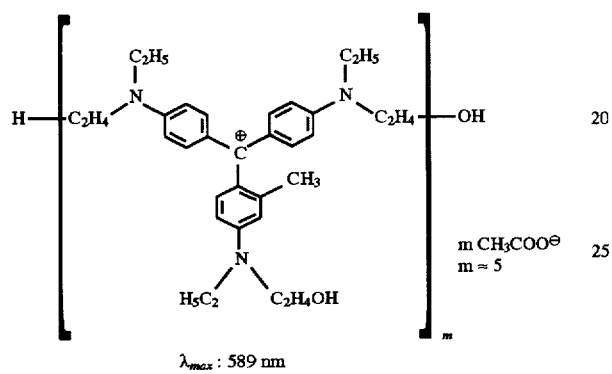

EXAMPLE 15

52.5g (0.167 mol) of the compound described in Example 1 and 5.25 g (0.03 mol) of N-ethyl-N-(2-hydroxyethyl)-3-methylaniline were dissolved in 150 g of glacial acetic acid and heated to 60° C. 15 g (0.15 mol) of 30% strength by weight aqueous formaldehyde solution were then added gradually in the course of 30 min and the mixture was subsequently stirred at 60° C. for a further 60 min. The solution was then cooled down to 45° C., admixed with 26.9 g (0.15 mol) of N-ethyl-N-(2-hydroxyethyl)-3-methylaniline, and heated to 43°–44° C. Then 1.5 g (0.08 mol) of chloranil and 1.5 g of the iron complex of dibenzotetraaza[14]annulene were added. The reaction batch was supplied with 3.4 l of oxygen (theory: 3.36 l) by means of a gas buret with vigorous stirring in the course of about 2 h while the temperature was held at 43°–44° C. Filtration yielded an about 33% strength by weight solution of the dye of the formula

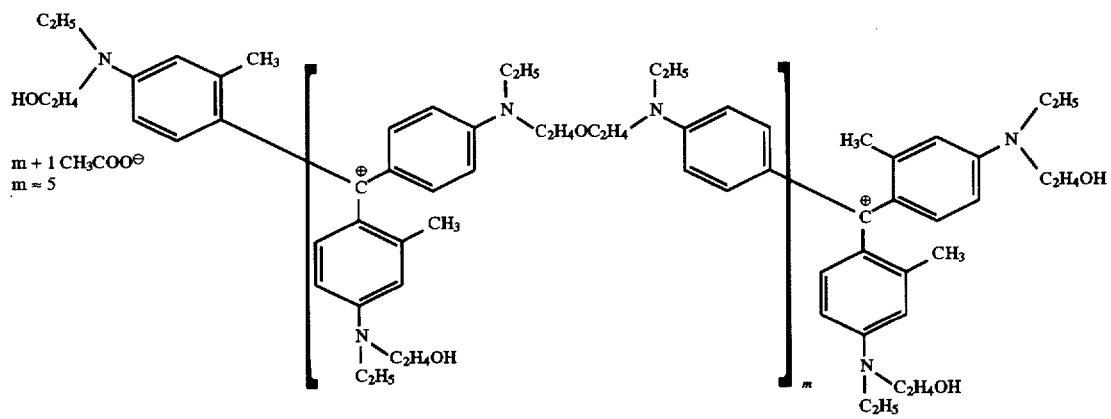

EXAMPLE 16

The chain length m was determined for an oligomeric diphenylmethane compound of the formula

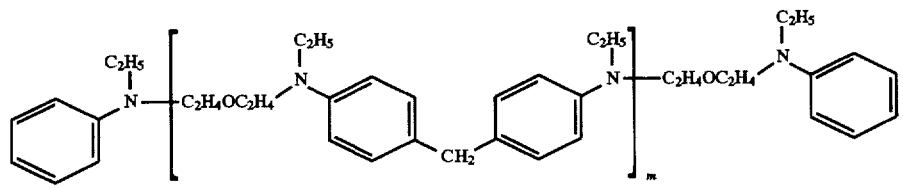

which was prepared as follows:

31.2 g (0.1 mol) of the compound described in Example 1 was stirred overnight at room temperature with 10.0 g (0.1 mol) of 30% strength by weight aqueous formaldehyde solution in 100 ml of glacial acetic acid. The reaction mixture was taken up in water and extracted with chloroform. The organic phase was dried and concentrated.

The vapor pressure osmometric molecular weight was about 4500, which corresponds to a chain length of about 14.

We claim:

1. Triarylmethanes of the formula I

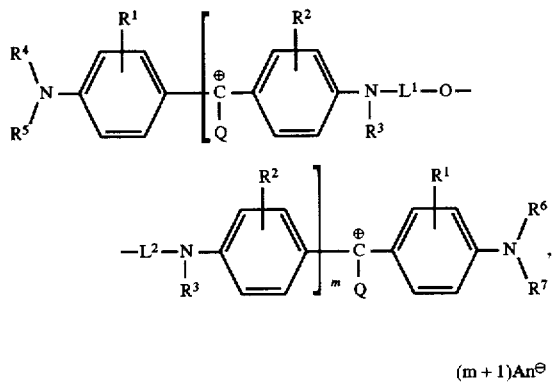

(I)

$(m+1)An^{\ominus}$ where m is from 1 to 100, $L^1$ and $L^2$ are independently of each other $C_2$–$C_4$-alkylene, $R^1$ and $R^2$ are independently of each other hydrogen, $C_1$–$C_4$-alkyl, $C_1$–$C_4$-alkoxy or halogen, $R^3$ is in each case hydrogen or $C_1$–$C_4$-alkyl, which may be substituted by hydroxyl, $C_1$–$C_4$-alkoxy, halogen or cyano, $R^4$, $R^5$, $R^6$ and $R^7$ are independently of each other hydrogen, $C_1$–$C_4$-alkyl, which may be hydroxyl-, $C_1$–$C_4$-alkoxy-, halogen- or cyano-substituted, substituted or unsubstituted phenyl or a radical of the formula

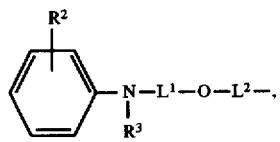

where $L^1$, $L^2$, $R^2$ and $R^3$ are each as defined above,

Q is a radical of the formula

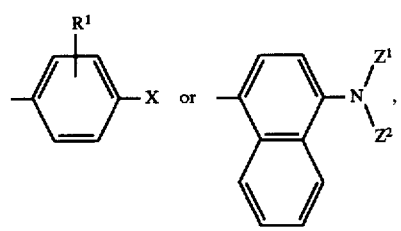

where $R^1$ is as defined above,

X is hydrogen, $C_1$–$C_4$-alkyl, $C_1$–$C_4$-alkoxy or a radical of the formula —$NZ^1Z^2$, and $Z^1$ and $Z^2$ are independently of each other hydrogen or $C_1$–$C_4$-alkyl, which may be hydroxyl-, $C_1$–$C_4$-alkoxy-, halogen- or cyano-substituted, or substituted or unsubstituted phenyl, and $An^{\ominus}$ is the equivalent of an anion.

2. Triarylmethanes as claimed in claim 1 wherein m is from 2 to 30.

3. Triarylmethanes as claimed in claim 1 wherein $L^1$ and $L^2$ are independently of each other $C_2$- or $C_3$-alkylene.

4. Triarylmethanes as claimed in claim 1 wherein $R^1$ and $R^2$ are independently of each other hydrogen or $C_1$–$C_4$-alkyl.

5. Triarylmethanes as claimed in claim 1 wherein $R^3$ is in each case $C_1$–$C_2$-alkyl.

6. Triarylmethanes as claimed in claim 1 wherein $R^4$ and $R^6$ are independently of each other $C_1$–$C_4$-alkyl and $R^5$ and $R^7$ are independently of each other $C_1$–$C_4$-alkyl, which may be hydroxyl- or cyano-substituted, or a radical of the formula

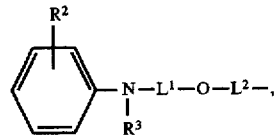

where $L^1$, $L^2$, $R^2$ and $R^3$ are each as defined in claim 1.

7. Triarylmethanes as claimed in claim 1 wherein Q is a radical of the formula

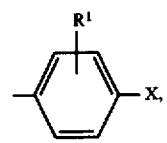

where $R^1$ and X are each as defined in claim 1.

8. Triarylmethanes as claimed in claim 1 wherein Q is a radical of the formula

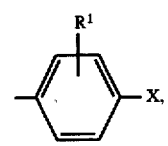

where $R^1$ is hydrogen or $C_1$–$C_4$-alkyl and X is hydrogen or a radical of the formula —$NZ^1Z^2$ where $Z^1$ and $Z^2$ are independently of each other $C_1$–$C_4$-alkyl, which may be substituted by hydroxyl or cyano.

9. Triarylmethanes as claimed in claim 1 wherein $L^1$ and $L^2$ are each $C_2$-alkylene.

10. A triarylmethane dye of the chemical formula:

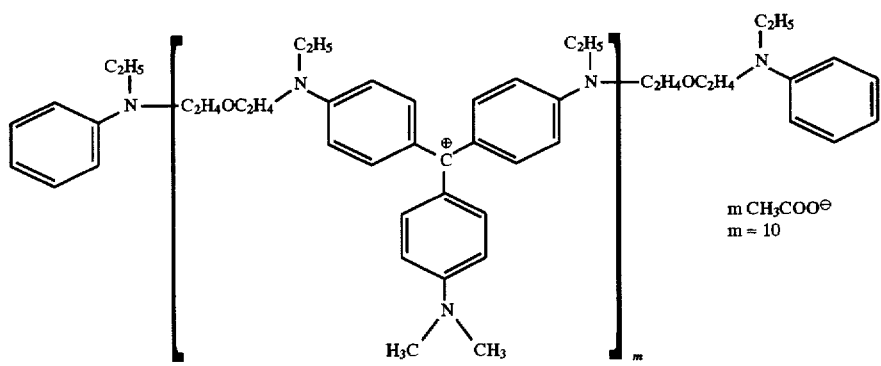
* * * * *